(12) United States Patent
Maekawa et al.

(10) Patent No.: US 6,240,910 B1
(45) Date of Patent: Jun. 5, 2001

(54) FUEL INJECTION CONTROL SYSTEM FOR COMPRESSED NATURAL GAS-FUELED AUTOMOTIVE VEHICLE

(75) Inventors: Masahiro Maekawa, Kobe; Kohei Igarashi; Hiroki Matsuoka, both of Susono, all of (JP); John Stephen Viggers, Gardena, CA (US)

(73) Assignees: Fujitsu Ten Limited, Kobe; Toyota Jidosha Kabushiki, Toyota, both of (JP); Toyota Technical Center, Ann Arbor, MI (US)

(*) Notice: Subject to any disclaimer, the term of this patent is extended or adjusted under 35 U.S.C. 154(b) by 0 days.

(21) Appl. No.: 09/493,664

(22) Filed: Jan. 28, 2000

(30) Foreign Application Priority Data

Jun. 2, 1999 (JP) .................................................. 11-155319

(51) Int. Cl.$^7$ .............................. F02B 43/00; F02B 77/08
(52) U.S. Cl. ..................... 123/529; 123/690; 123/198 D; 123/198 DB
(58) Field of Search ................................... 123/527, 529, 123/198 D, 198 DB, 690

(56) References Cited

U.S. PATENT DOCUMENTS 5,549,097 * 8/1996 Nimberger ............................ 123/690
5,632,250 * 5/1997 Kato et al. ...................... 123/198 DB
5,829,418   11/1998 Tamura et al. .
6,009,860 * 1/2000 Brown et al. ......................... 123/529
6,041,762 * 3/2000 Sirosh et al. ......................... 123/529

FOREIGN PATENT DOCUMENTS 62-162760    7/1987  (JP) .
62-233441   10/1987  (JP) .
 9-287524   11/1997  (JP) .

* cited by examiner

Primary Examiner—Erick Solis
(74) Attorney, Agent, or Firm—Oliff & Berridge, PLC

(57) ABSTRACT

A compressed natural gas-fueled automotive vehicle is disclosed in which the fail-safe control operation is performed thereby to secure the safety of the vehicle when the gas pressure drops. If the remaining amount of the gas is very small, an engine misfire occurs. If the catalyst temperature is high, the uncombusted gas begins to burn on contact with the high-temperature catalyst in the catalyst unit. In view of this, upon detection of both a gas pressure drop and the vehicle moving condition or upon detection of both a gas pressure drop and an increased catalyst temperature, the fuel supply is stopped or the vehicle speed is reduced to thereby reduce the catalyst temperature. As a result, uncombusted gas is not burnt in the catalyst unit and the catalyst unit is prevented from being destroyed.

23 Claims, 16 Drawing Sheets

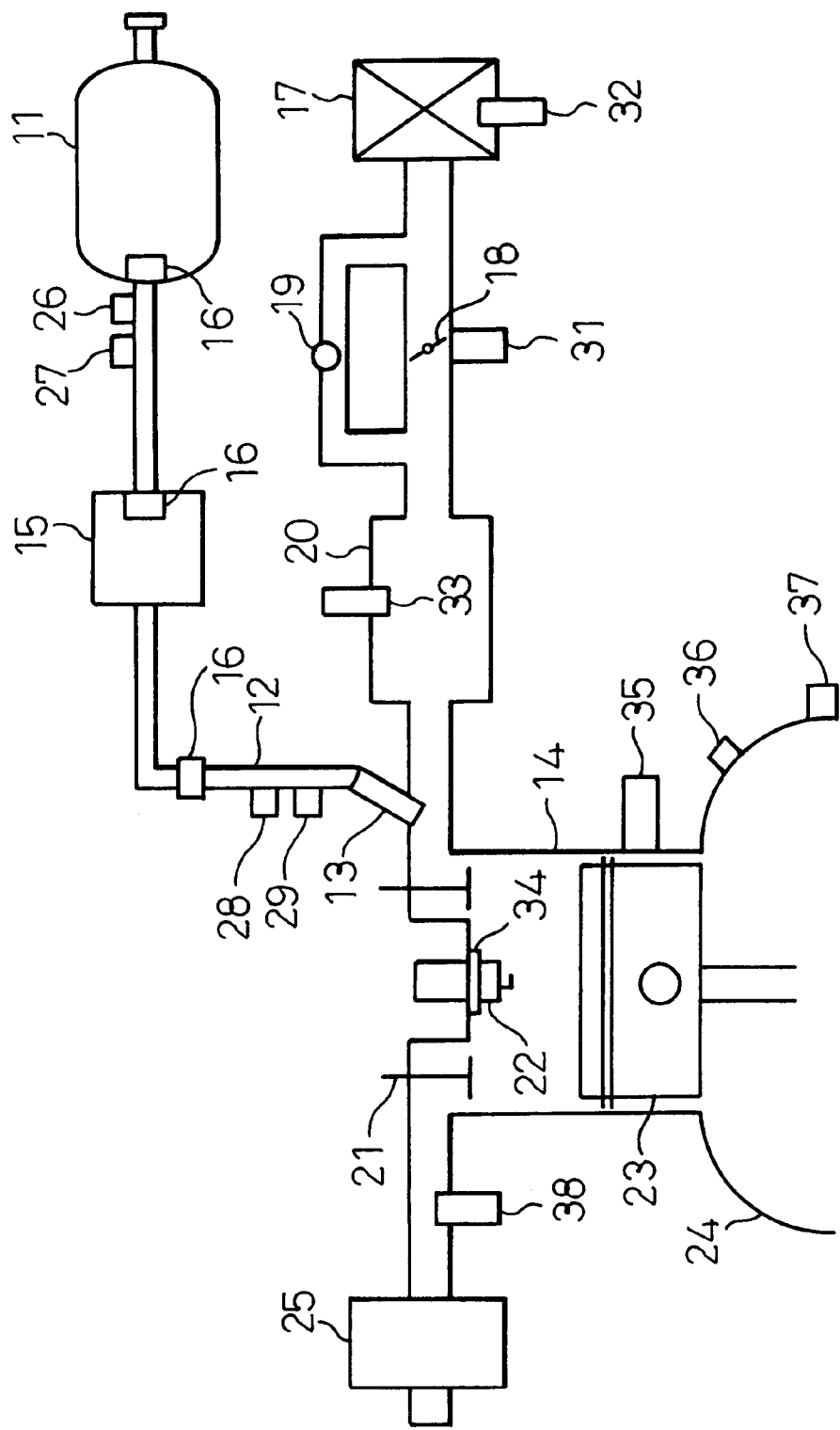

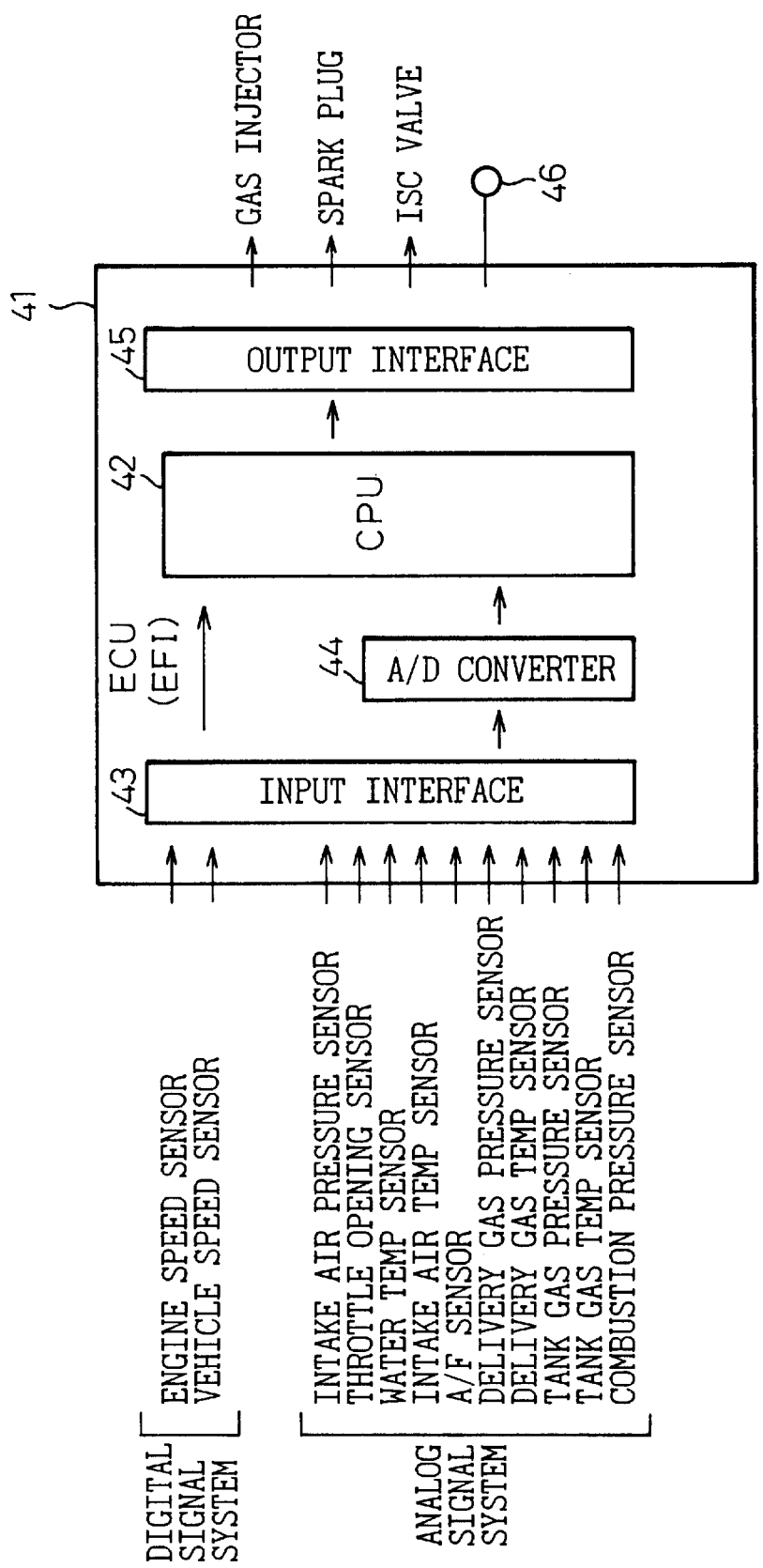

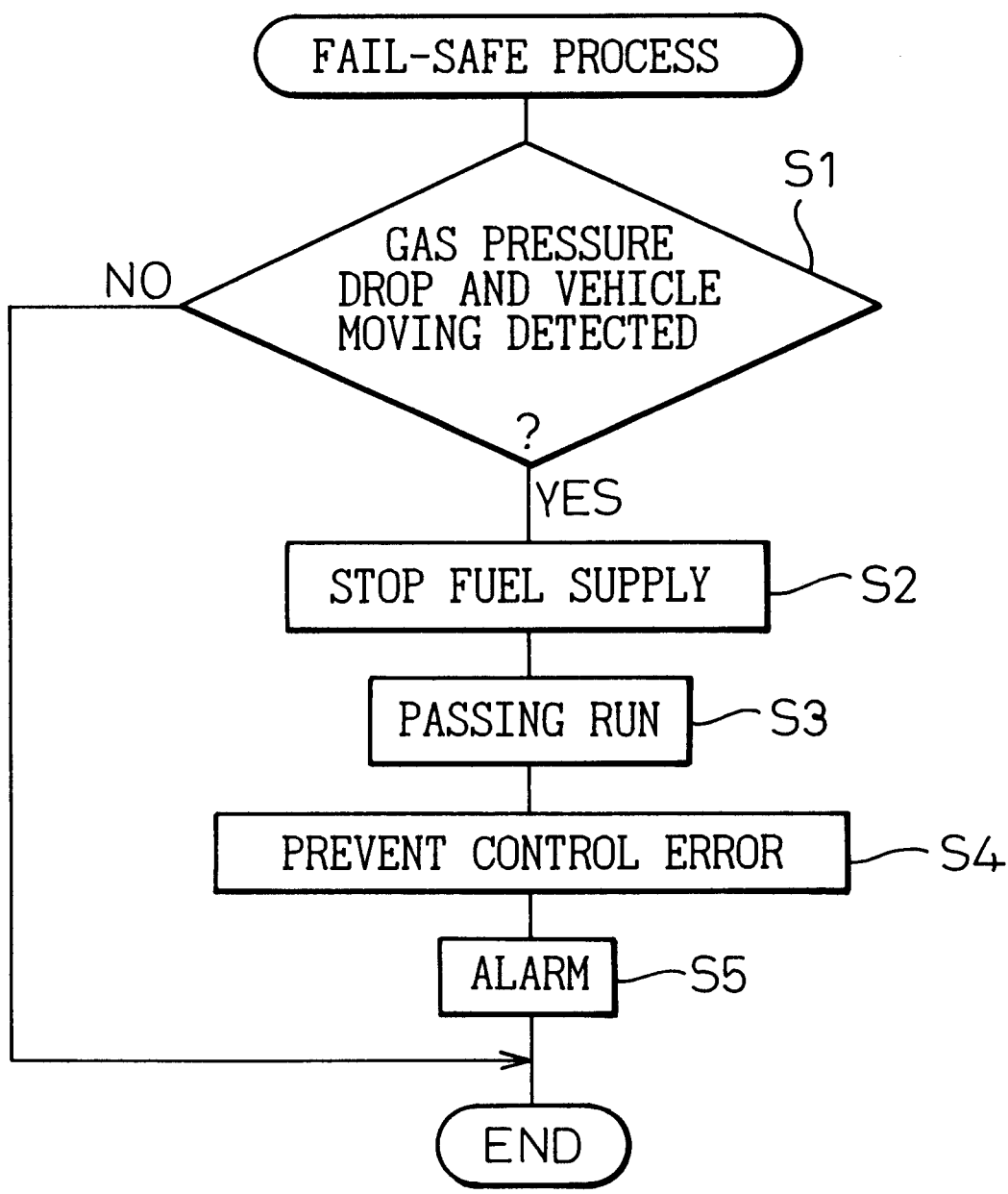

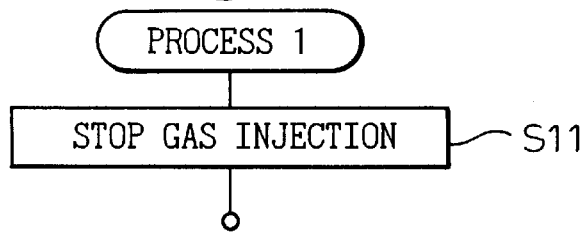
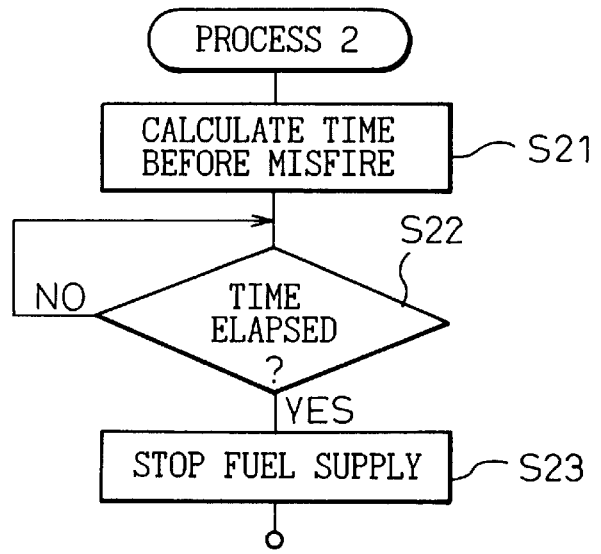
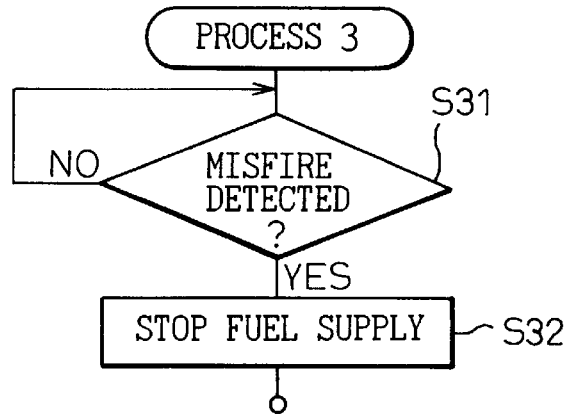

FUEL INJECTION CONTROL SYSTEM FOR COMPRESSED NATURAL GAS-FUELED AUTOMOTIVE VEHICLE

BACKGROUND OF THE INVENTION

1. Field of the Invention

The present invention relates to a fuel injection control system for a compressed natural gas-fueled automotive vehicle using compressed natural gas (CNG) as a fuel.

2. Description of the Related Art

A compressed natural gas-fueled vehicle uses compressed natural gas instead of the gasoline as a fuel. The compressed natural gas is mixed with air in an intake manifold and supplied to the engine. In the compressed natural gas-fueled vehicle, high-pressure natural gas is stored in a tank. For this reason, a sensor for detecting the gas pressure is included for fail-safe control such as closing a gas shutoff valve when the gas leaks. This fail-safe control operation is not performed in the case where the gas is consumed to such an extent that the residual gas amount has been reduced to a very small level.

In the case where the residual amount of gas has reached to a very small level, however, a misfire may occur due to the fuel shortage in the engine. If a high load operation (high-speed run, for example) of the vehicle is continued under this condition, the uncombusted gas which may be discharged from the engine into a catalyst unit is burnt by a catalyst already very high in temperature. Thus, the catalyst is heated to an abnormal temperature and thus may give rise to a breakdown of the catalyst unit or another problem may result.

SUMMARY OF THE INVENTION

The object of the present invention is to provide a compressed natural gas-fueled automotive vehicle in which the fail-safe control operation is performed when the gas pressure is reduced to thereby secure the safety of the vehicle.

The present invention has been developed to achieve the object described above.

According to a first aspect of the invention, there is provided a fuel injection control system, for a compressed natural gas-fueled vehicle using compressed natural gas as a fuel, comprising a gas pressure sensor for detecting the gas pressure in the fuel supply path and a drive sensor for detecting the vehicle moving condition, wherein the fuel injection control unit for controlling the fuel injection apparatus stops supplying the fuel when the gas pressure sensor detects a reduction in gas pressure and the drive sensor detects that the vehicle is running.

In a compressed natural gas-fueled vehicle, when the gas is consumed to such an extent that the residual amount of the gas in the tank reaches a very low level, the gas pressure in the fuel supply route is reduced and a misfire occurs in the engine. Also, when the vehicle is moving, the catalyst temperature becomes so high that the uncombusted gas comes into contact with the high-temperature catalyst in the catalyst unit and begins to burn. In the case where the fuel supply is stopped upon detection of the vehicle moving and a low gas pressure, in contrast, uncombusted gas is not discharged into the catalyst unit. As a result, the catalyst unit is prevented from being broken down due to the abnormal heating of the catalyst.

According to a second aspect of the invention, there is provided a fuel injection control system, of a compressed natural gas-fueled vehicle using the compressed natural gas a fuel, comprising a gas pressure sensor for detecting the gas pressure in a fuel supply path and catalyst temperature detecting means for detecting the temperature of the catalyst arranged downstream of the internal combustion engine, wherein the fuel injection control unit for controlling the fuel injection control apparatus stops supplying fuel when the gas pressure sensor detects a reduction in gas pressure and the catalyst temperature detecting means detects a catalyst temperature not lower than a predetermined value.

In the second aspect of the invention, when the gas pressure is reduced, the fuel supply is stopped upon detection of a catalyst temperature not lower than a predetermined value, and therefore uncombusted gas is not discharged into the catalyst unit, thereby preventing the catalyst unit from being broken down due to abnormal heating of the catalyst.

In the first and second aspects of the invention, the uncombusted gas is prevented from burning in the catalyst unit by stopping the fuel supply.

According to third and fourth aspects of the invention, in contrast, there is provided a fuel injection control system, for a compressed natural gas-fueled vehicle, in which the vehicle speed is reduced instead of stopping the fuel supply.

Specifically, according to the third aspect of the invention, the vehicle speed is reduced when a gas pressure sensor detects a reduction in gas pressure and when the drive sensor detects that the vehicle is moving.

According to the fourth aspect of the invention, on the other hand, the vehicle speed is reduced when the gas pressure sensor detects a reduction in gas pressure and when the catalyst temperature detecting unit detects a catalyst temperature not lower than a predetermined value. With the reduction in vehicle speed, the catalyst temperature drops so that the uncombusted gas, even if it is discharged into the catalyst unit, is not burned.

BRIEF DESCRIPTION OF THE DRAWINGS

The above object and features of the present invention will be more apparent from the following description of the preferred embodiment with reference to the accompanying drawings, wherein:

FIG. 1 shows a configuration of a fuel injection control system of a compressed natural gas-fueled automotive vehicle according to a first embodiment of the present invention;

FIG. 2 shows a configuration of an ECU used for the system of FIG. 1;

FIG. 3 is a flowchart showing the contents of the fail-safe processing of the ECU of FIG. 2;

FIG. 4 is a flowchart showing the process 1 making up an example of step S2 in FIG. 3;

FIG. 5 is a flowchart showing the process 2 making up an example of step S2 in FIG. 3;

FIG. 6 is a flowchart showing the process 3 making up an example of step S2 in FIG. 3;

DESCRIPTION OF THE PREFERRED EMBODIMENTS

Figure 7:
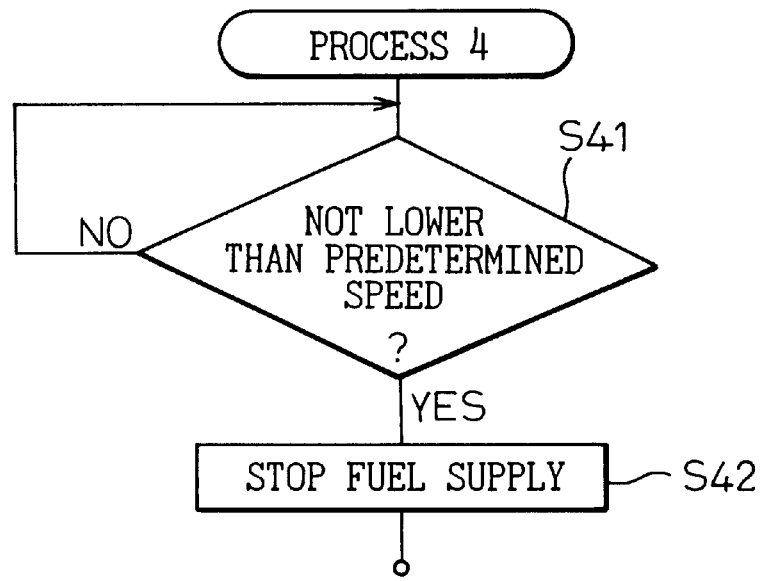
FIG. 7 is a flowchart showing the process 4 making up an example of step S2 in FIG. 3.

Embodiments of the present invention will be described with reference to the drawings.

(Embodiment 1)

FIG. 1 is a diagram showing a configuration of a fuel injection control system, of a compressed natural gas-fueled vehicle, according to a first embodiment of the invention.

The compressed natural gas stored in a gas tank 11 is injected into the air intake side of an engine 14 from a gas injector 13 through a delivery pipe 12. A pressure regulator 15 is arranged midway in the delivery pipe 12. An electromagnetic shutoff valve 16 is arranged at the outlet of the gas tank 11, at the inlet of the pressure regulator 15 and in the delivery pipe 12 between the pressure regulator 15 and the gas injector 13.

On the air intake side of the engine 14, the air is introduced through an air cleaner 17, a throttle valve 18, an ISC valve 19 and a surge tank 20. The compressed natural gas is injected from the gas injector 13 into the introduced air, so that the fuel and the air are mixed with each other and supplied to the engine 14. The engine 14 includes a valve 21, a spark plug 22, a piston 23 and a crankcase 24. A catalyst unit 25 is arranged on the exhaust air side.

Various sensors used for controlling the fuel injection are arranged in the manner described below. The detection signal of each sensor is output to an ECU (electronic control unit) described later. A tank gas pressure sensor 26 and a tank gas temperature sensor 27 are arranged at the outlet of the gas tank 11. A delivery gas pressure sensor 28 and a delivery gas temperature sensor 29 are arranged at the inlet of the gas injector 13.

A throttle opening sensor 31 is arranged in interlocked relation with the throttle valve 18. An intake air pressure sensor 33 is arranged in the surge tank 20, and an intake air temperature sensor 32 is arranged in the air cleaner 17. In place of the intake air pressure sensor 33, an air flowmeter can be arranged at the outlet of the air cleaner 17.

A combustion pressure sensor 34 is arranged in the combustion chamber of the engine 14. A water temperature sensor 35, an engine speed sensor 36 and a vehicle speed sensor 37 are also arranged. An A/F (air-fuel ratio sensor) 38 is arranged at the outlet of the engine 14.

FIG. 2 shows a configuration of the ECU (electronic control unit) 41. The ECU 41 includes a fuel injection control unit (EFI).

The ECU 41 includes a CPU 42, an input interface 43, an A/D converter 44 and an output interface 45. The detection signals of the various sensors shown in FIG. 1 are input to the input interface 43.

The detection signals of the engine speed sensor 36 and the vehicle speed sensor 37 are digital signals, and therefore input directly to the CPU 42 from the input interface 43.

The detection signals of the tank gas pressure sensor 26, the tank gas temperature sensor 27, the delivery gas pressure sensor 28, the delivery gas temperature sensor 29, the intake air pressure sensor 33, the throttle opening sensor 31, the intake air temperature sensor 32, the combustion pressure sensor 34, the water temperature sensor 35 and the A/F sensor 38 are analog signals, and are therefore input to the CPU 42 after being converted into digital signals by the A/D converter 44.

The CPU 42 controls the injection of the gas injector 13, the ignition timing of the spark plug 22 and the operation timing of the valve 21 based on the detection signals of the various sensors. Also, when the gas pressure drops or the fuel supply stops, the CPU 42 turns on or flashes the alarm light 46. The alarm light 46 is arranged on the dashboard.

FIG. 3 is a flowchart showing the fail-safe processing of the fuel injection control unit. The fuel injection control unit is realized by the CPU 42.

The fuel injection control unit starts the fail-safe processing at predetermined time intervals.

In step S1, it is determined whether a gas pressure drop of not more than a predetermined value and the vehicle moving condition have been detected or not. Upon detection of the gas pressure drop and the vehicle moving condition, there is a chance of the catalyst unit 25 being destroyed, and therefore the process proceeds to step S2 and subsequent steps for stopping the fuel supply. If the gas pressure drop or the vehicle running is not detected, the catalyst unit 25 cannot be destroyed and therefore the process is terminated.

The delivery gas pressure sensor 28 or the tank gas pressure sensor 26 is used for detecting the gas pressure. The relation between gas pressure and gas density changes with temperature, and therefore the gas pressure may be corrected by the gas temperature detected by the tank gas temperature sensor 27 or the delivery gas temperature sensor 29.

The vehicle moving, which can be detected by the vehicle speed sensor 37, is alternatively detected by determining whether the vehicle is moving or not from the detection signals using the engine speed sensor 36 and the intake air pressure sensor 33. As another alternative, the vehicle moving condition can be detected based on the intake air amount detected on the air flowmeter.

The process for stopping the fuel supply and the related process are performed in step S2 and subsequent steps. First, the steps including S2 and subsequent steps will be briefly explained. In step S2, the process for stopping the fuel supply is executed. In step S3, process is performed for pulling off the road following the fuel supply stop. In step S4, process is performed for preventing an error in the air-fuel ratio feedback control. In step S5, process is performed for issuing an alarm to the driver.

Steps S2 to S5 will be explained in detail.

In the process for stopping the fuel supply in step S2, one of the processes 1 to 5 below is executed. Depending on the specific process, however, a plurality of processes may be executed in combination.

(Process 1)

By controlling the gas injector 13, the gas injection is stopped to stop fuel supply. In other words, upon detection both the gas pressure drop and the vehicle moving, the fuel supply is immediately stopped in step S11 as shown in FIG. 4. By stopping the fuel supply, uncombusted gas is not delivered to the catalyst unit 25 and therefore no uncombusted gas starts burning in the catalyst unit, thereby preventing the catalyst unit from being destroyed. By the way, the fuel supply can be stopped also by closing the electromagnetic shutoff valve 16 arranged on the delivery path 12.

(Process 2)

As shown in FIG. 5, the time before a misfire occurs is calculated in step S21, and after the lapse of the particular time in step S22, the fuel supply is stopped in step S23. The compressed natural gas-fueled vehicle moves a long time until a misfire occurs after the gas pressure drops. Therefore, even when both the gas pressure drop and the vehicle moving condition are detected, the fuel supply is not immediately stopped so that pulling off the road or the like is made possible.

The time until a misfire can be calculated from the gas pressure, the engine speed and the fuel injection amount. In the case where the gas pressure is high, a longer time is available, while in the case where the engine speed and the fuel injection amount are large, the time is shorter. The gas pressure can be detected by the sensor described in step S1, and the engine speed can be detected by the engine speed sensor 36. The fuel injection amount can be obtained from the value calculated when the EFI controls the fuel injection.

(Process 3)

As shown in FIG. 6, when a misfire is detected in step S31, i.e. when a misfire actually occurs after detecting the gas pressure drop and the vehicle running, the fuel supply is stopped in step S32. The misfire can be detected by the combustion pressure sensor 34 mounted in the combustion chamber. As a result, an effect similar to the process 2 described above can be obtained.

(Process 4)

As shown in FIG. 7, in the case where the vehicle speed is not lower than a predetermined value in step S41, the fuel supply is stopped in step S42. In the case where the vehicle speed is low, on the other hand, the catalyst temperature is not so high, and therefore even when uncombusted gas is delivered to the catalyst unit 25, burning does not start in the catalyst unit 25. Upon detection of both the gas pressure drop and the vehicle moving condition, therefore, the fuel supply is stopped only when the vehicle speed is not lower than a predetermined value. The vehicle speed, which can be detected by the vehicle speed sensor 37, can also be obtained by converting the detection signal values of the intake air pressure sensor 33 and the engine speed sensor 36. Also, the vehicle speed can be detected based on the intake air amount detected by the air flowmeter.

(Process 5)

Figure 8:
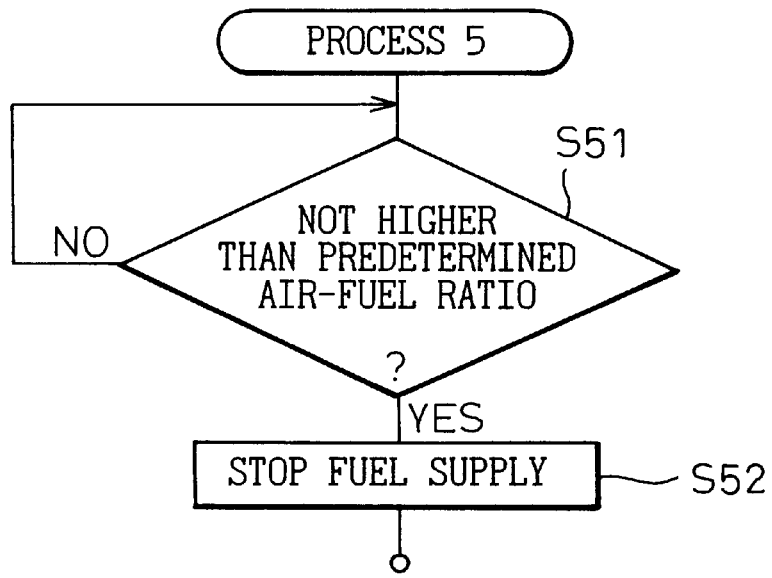
FIG. 8 is a flowchart showing the process 5 making up an example of step S2 in FIG. 3.

As shown in FIG. 8, in the case where the air-fuel ratio is low in step S51, the fuel supply is stopped in step S52. In the case where the air-fuel ratio is high, on the other hand, as in process 4 above, the catalyst unit 25 is not destroyed. Thus, upon detecting the gas pressure drop and the vehicle moving condition, the fuel supply is stopped only in the case where the air-fuel ratio is not more than a predetermined value. The air-fuel ratio can be detected by the A/F sensor 38. In place of the A/F sensor 38, an oxygen concentration sensor can be provided for calculating the air-fuel ratio from the oxygen concentration.

In the process for the passing run after the fuel supply stop in step S3, one of the following processes 6 and 7 is executed.

(Process 6)

Figure 9:
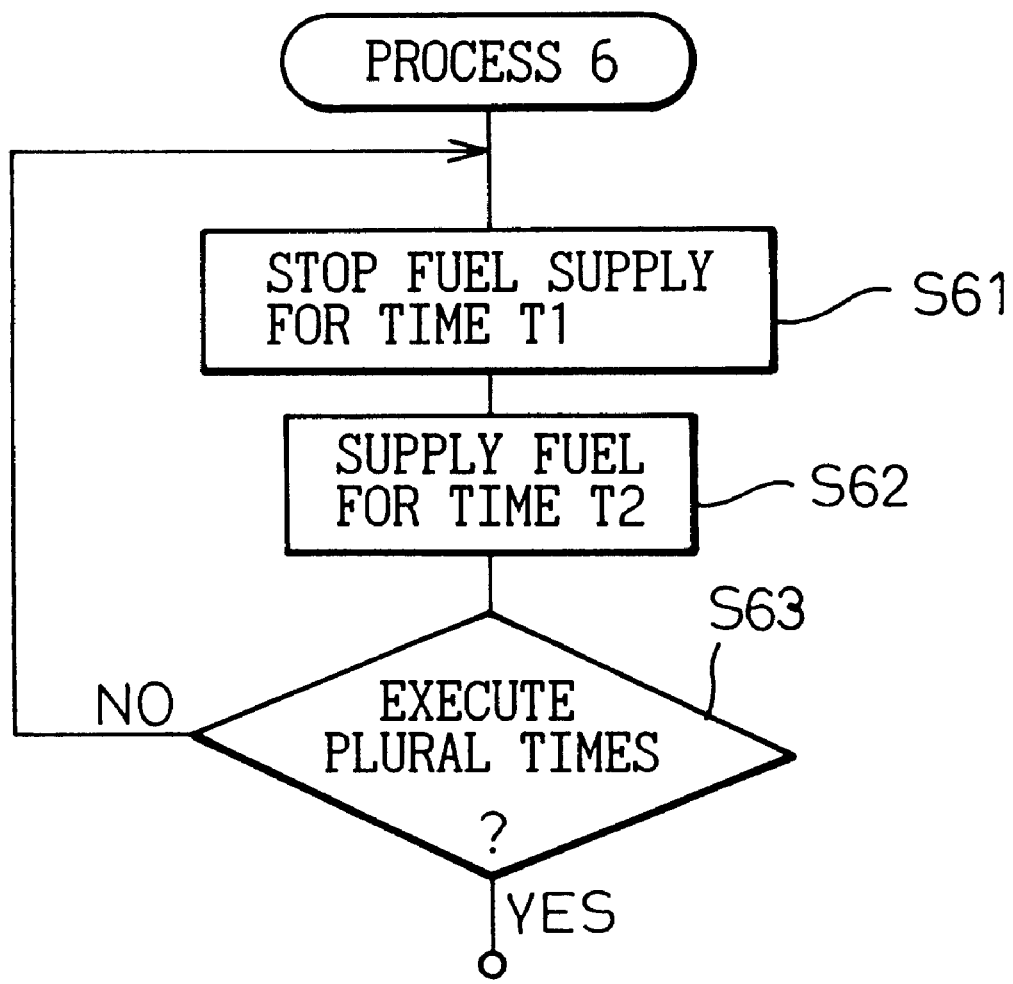
FIG. 9 is a flowchart showing the process 6 making up an example of step S3 in FIG. 3.

As shown in FIG. 9, in steps S61 to S63, the fuel supply stop and the fuel supply are alternated at predetermined time intervals. As a result, the vehicle speed decreases. In view of the fact that the fuel is supplied continually, however, the driver can continue to run the vehicle and can reach a safe place. Also, the catalyst can be prevented from being abnormally heated by the burning of uncombusted gas in the catalyst unit 25.

(Process 7)

Figure 10:
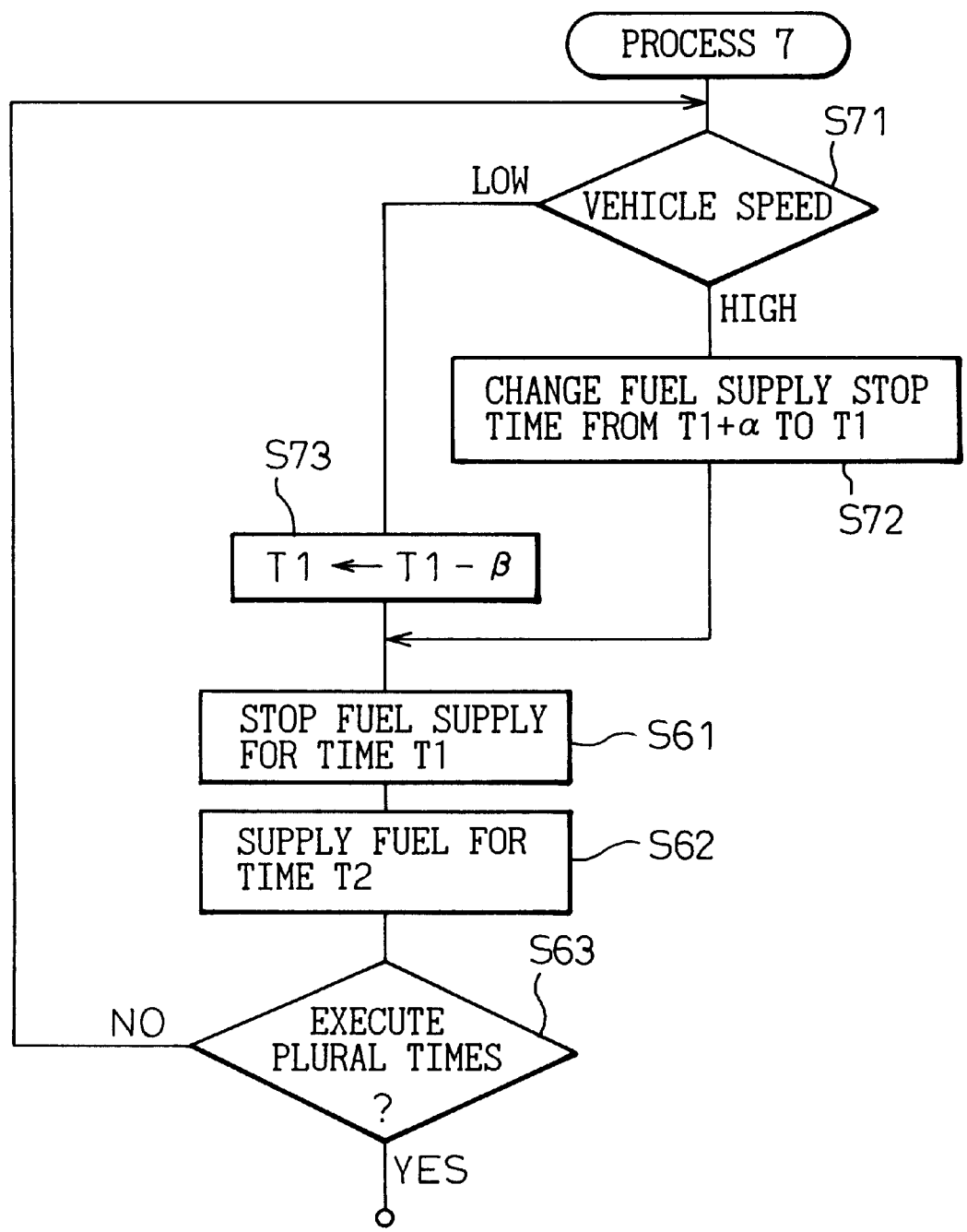
FIG. 10 is a flowchart showing the process 7 making up an example of step S3 in FIG. 3.

The fuel supply and the fuel supply stop are alternated at time intervals corresponding to the vehicle speed, etc. As described above, as long as the vehicle speed is low, the catalyst temperature fails to increase, while in the case where the vehicle speed is high, the catalyst temperature increases. As shown in FIG. 10, therefore, when the vehicle speed is high in step S71, the duration of the fuel supply stop is lengthened as compared with when the vehicle speed is low in step S72, so that the uncombusted gas is not burnt even if brought into contact with the catalyst. In the case where the vehicle speed is low in step S71, on the other hand, the duration of the fuel supply stop is shortened in step S73 to thereby facilitate the moving of the vehicle. The catalyst temperature also varies with the air-fuel ratio as well as with the vehicle speed. Thus, the time interval at which the fuel supply stop and the fuel supply are alternated can be determined in accordance with the detection values of the vehicle speed sensor 37 and the intake air pressure sensor 33 for the process 4 or the A/F sensor 38 and the oxygen concentration sensor for the process 5.

In the process for preventing the error in the air-fuel ratio feedback control in step S4 of FIG. 3, one of the following processes 8 to 10 is executed.

In the air-fuel ratio feedback control, the air-fuel ratio (or oxygen concentration) is detected by the A/F sensor 38 (or the oxygen concentration sensor) whereby the fuel injection amount is controlled by feedback. Also, this control operation often employs learning. If the fuel supply stops during this control operation, the element temperature of the A/F sensor 38 (or the oxygen concentration sensor) decreases, and the output voltage assumes an abnormal value, thereby making it impossible to continue the normal air-fuel ratio feedback control. In view of this, one of the following processes 8 to 10 is executed.

(Process 8)

Figure 11:
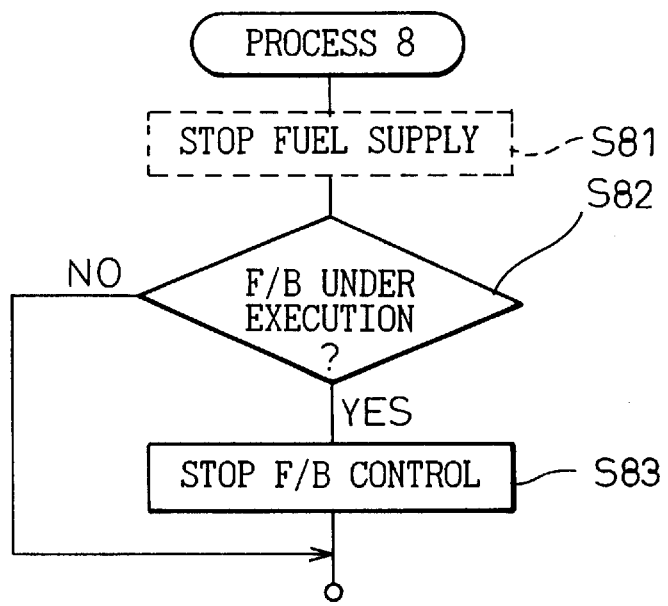
FIG. 11 is a flowchart showing the process 8 making up an example of step S4 in FIG. 3.

As shown in FIG. 11, in the case where the air-fuel ratio feedback control is executed in step S82 after the fuel supply stop in step S81, the air-fuel ratio feedback control is stopped in step S83.

(Process 9)

Figure 12:
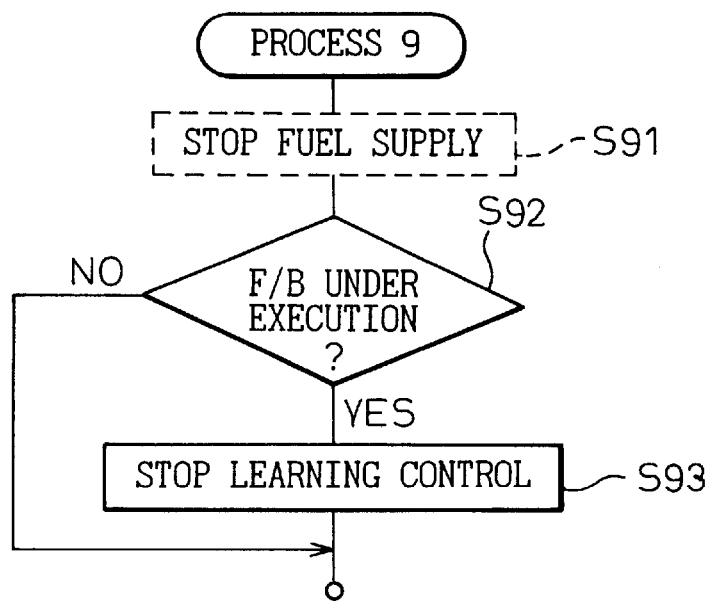
FIG. 12 is a flowchart showing the process 9 making up an example of step S4 in FIG. 3.

As shown in FIG. 12, in the case where the air-fuel ratio feedback control is executed in step S92 after the fuel supply stop in step S91, on the other hand, the air-fuel ratio control operation which employs learning is stopped in step S93.

(Process 10)

Figure 13:
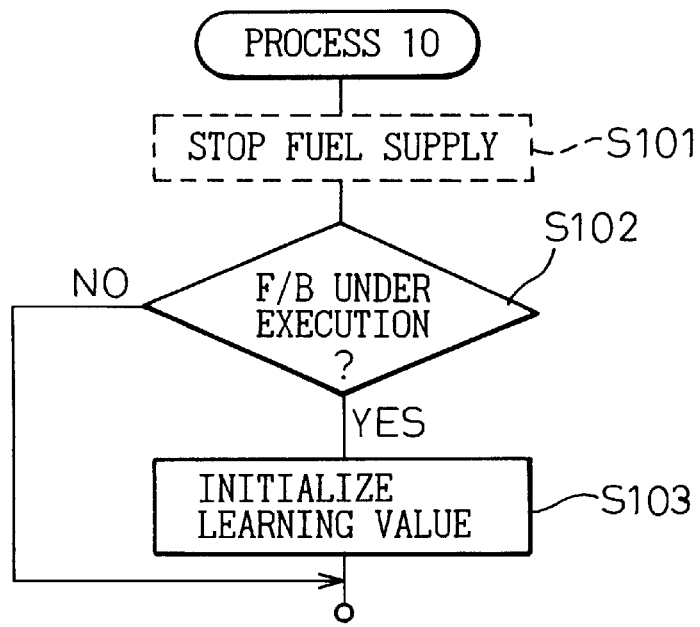
FIG. 13 is a flowchart showing the process 10 making up an example of step S4 in FIG. 3.

As shown in FIG. 13, in the case where the air-fuel ratio feedback control is under execution in step S102 after the fuel supply stop in step S101, on the other hand, the air-fuel ratio learning value is initialized in step S103.

In the process for issuing an alarm to the driver in step S5 of FIG. 3, the following processes 11 and 12 are executed independently of each other or in combination.

(Process 11)

Figure 14:
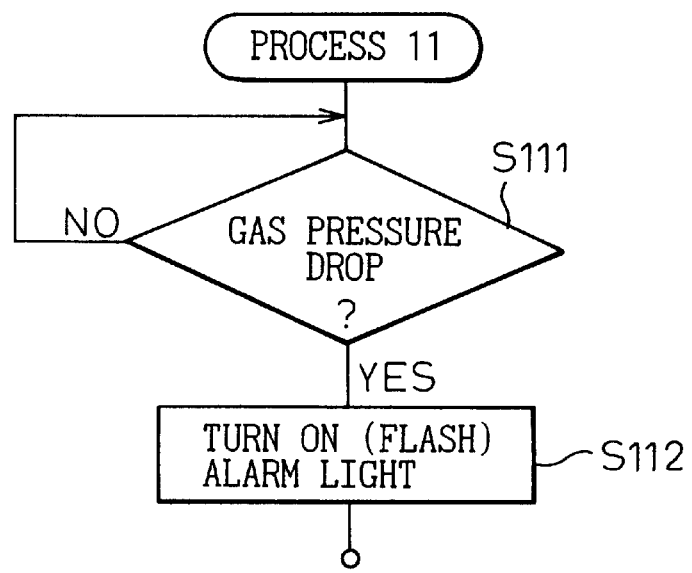
FIG. 14 is a flowchart showing the process 11 making up an example of step S5 in FIG. 3.

As shown in FIG. 14, upon detection of the gas pressure drop in step S111, the alarm light 46 is turned on or is made to flash in step S112, thus informing the driver that the remaining amount of the gas is small. The driver, upon receipt of the alarm, takes necessary action such as pulling off the road. In the prior art, the alarm on the decrease in the remaining amount of the gas is issued by detecting the fuel level drop mechanically. In this embodiment, however, the fall in the remaining gas amount can be electronically detected and therefore the reliability is improved.

(Process 12)

Figure 15:
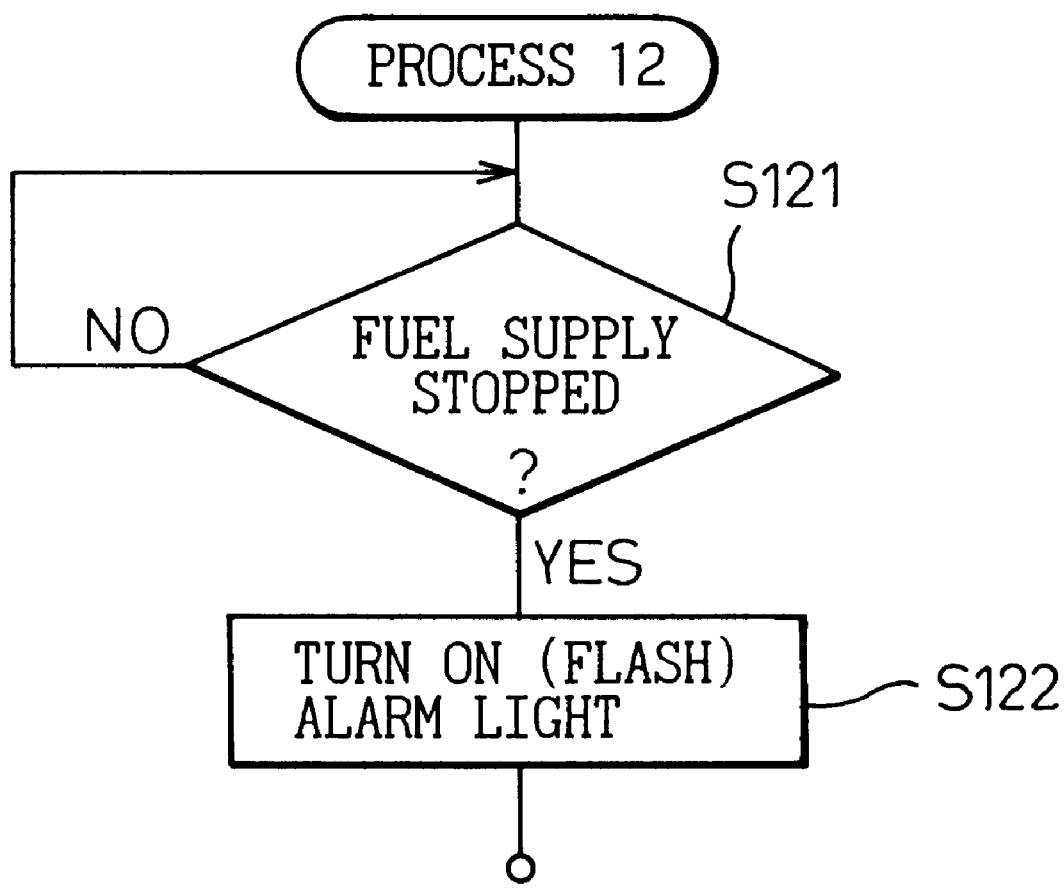
FIG. 15 is a flowchart showing the process 12 making up an example of step S5 in FIG. 3.

As shown in FIG. 15, when the fuel supply is stopped in step S121, the alarm light 46 is turned on or made to flash in step S122 to warn the driver about a fuel supply stop. In the case where the processes 11 and 12 are combined, the alarm light 46 can be turned on when the gas pressure drops and made to flash when the fuel supply is stopped.

(Embodiment 2)

According to the first embodiment described above, the fuel injection control unit for controlling the fuel injection unit stops supplying the fuel in the case where the gas pressure sensor detects a drop in the gas pressure and the drive sensor detects that the vehicle is moving at the same time. In the second embodiment, on the other hand, the fuel stops being supplied in the case where the catalyst temperature detecting means detects a catalyst temperature of not lower than a predetermined value. According to this second aspect of the invention, uncombusted gas is not discharged into the catalyst unit when the catalyst temperature is high, and therefore the catalyst unit is prevented from being destroyed by abnormal heating of the catalyst.

The second embodiment can utilize the configuration of the fuel injection control system shown in FIG. 1. Also, the configuration of the ECU shown in FIG. 2 can be used with the system.

Figure 16:
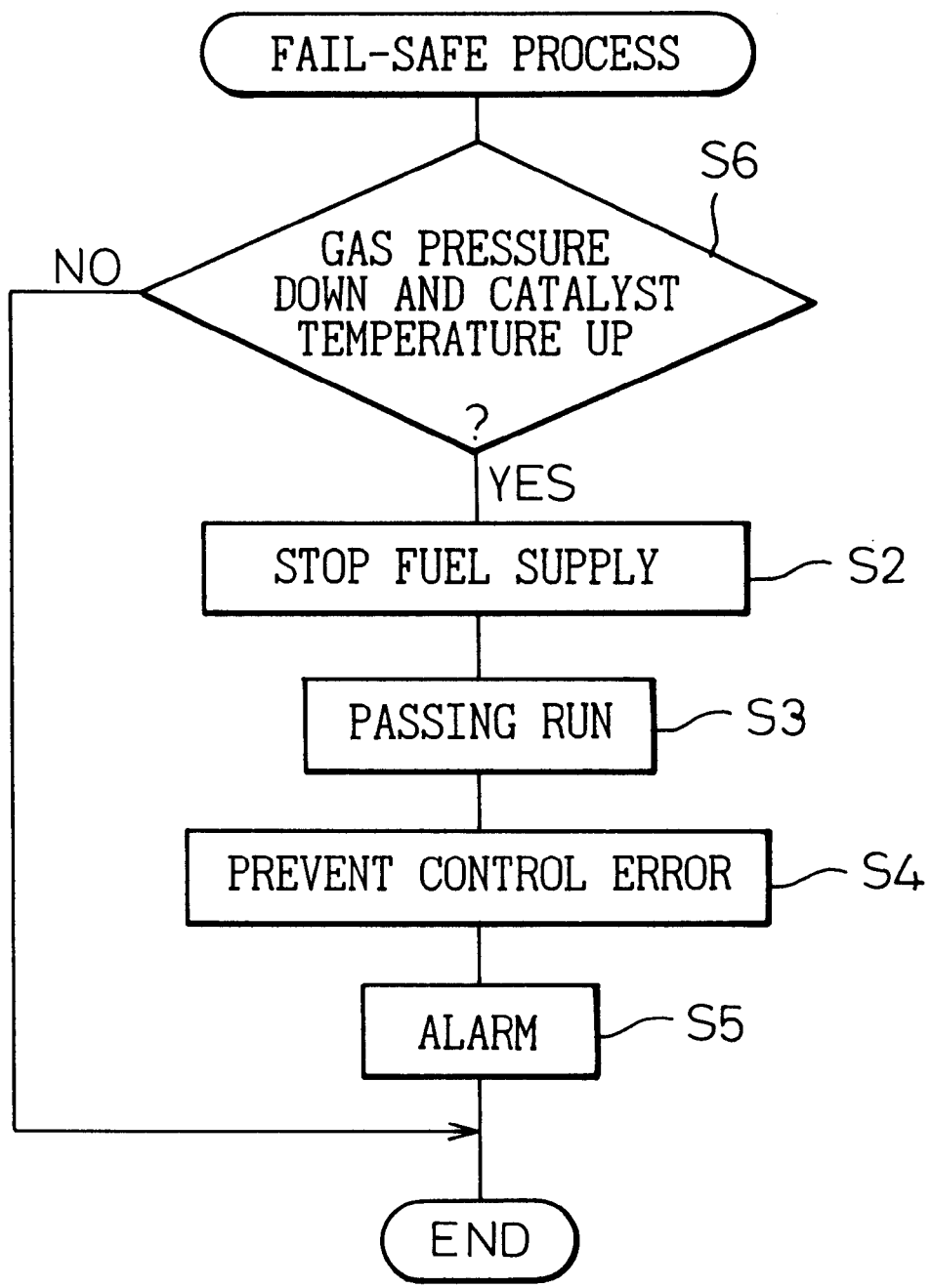
FIG. 16 is a flowchart showing the contents of the fail-safe processing of the ECU according to a second embodiment of the invention.

The fail-safe process using the fuel injection control unit will be explained with reference to the flowchart of FIG. 16. The flowchart of FIG. 16 is similar to FIG. 3 of the first embodiment except for step S6, and therefore only step S6, but not the remaining steps S2 to S5, will be explained.

In step S6, it is determined whether a gas pressure drop of not more than a predetermined value and a catalyst temperature of not lower than a predetermined value have been detected or not. The gas pressure is detected using the delivery gas pressure sensor 28 or the tank gas pressure sensor 26. The catalyst temperature can be calculated using the engine speed and the intake air amount. The engine speed, on the other hand, is detected by the engine speed sensor 36, and the intake air amount is detected by the intake air pressure sensor 33. By the way, a catalyst sensor can be arranged in the catalyst unit 25.

Upon detection of a gas pressure drop and an increased catalyst temperature, the catalyst unit 2 may be destroyed. Therefore, the process proceeds to step S2 and subsequent steps for stopping the fuel supply. Unless the gas pressure drops or the catalyst temperature increases, the catalyst unit 25 is not destroyed, and therefore the process is terminated. The process of step S2 and subsequent steps is similar to the corresponding process of the first embodiment.

(Embodiment 3)

In the first and second embodiments described above, uncombusted gas is prevented from being burnt in the catalyst unit by stopping the fuel supply. According to the third embodiment, in contrast, the vehicle speed is reduced instead of stopping the fuel supply. With the reduction in vehicle speed, the catalyst temperature decreases. Therefore, uncombusted gas, even if delivered into the catalyst unit, is not burnt.

Figure 17:
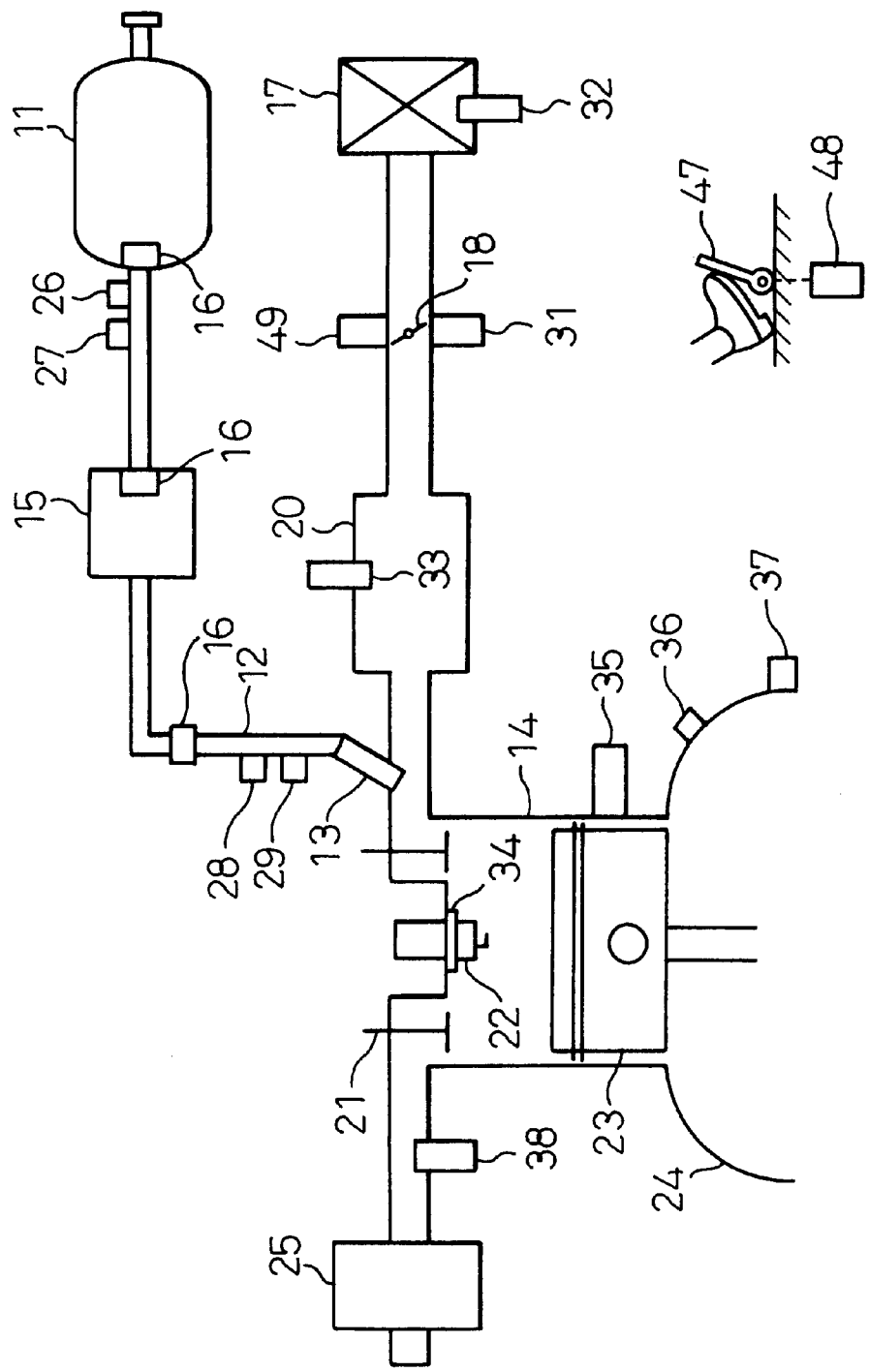
FIG. 17 shows a configuration of a fuel injection control system of a compressed natural gas-fueled vehicle according to a third embodiment of the invention.
Figure 18:
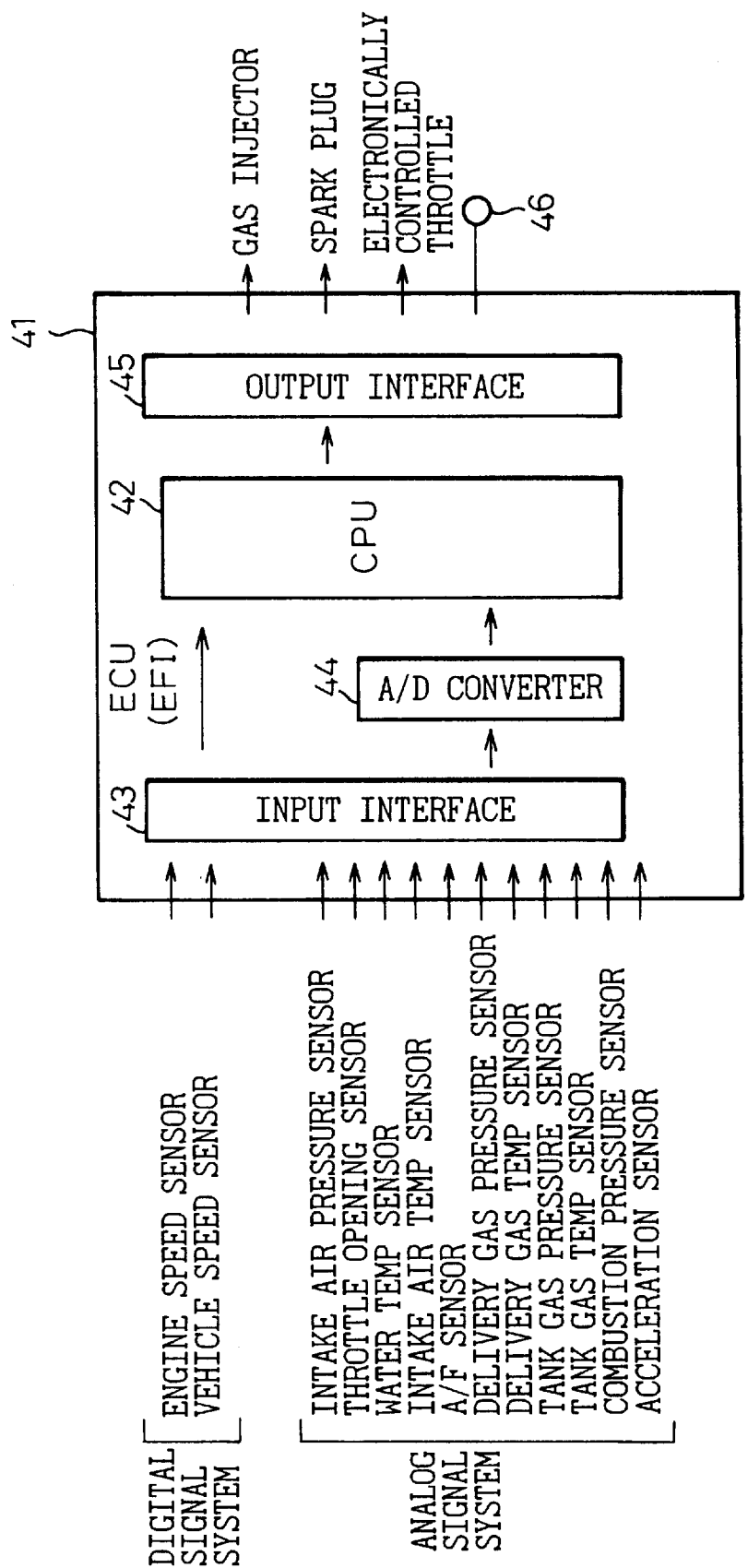
FIG. 18 shows a configuration of the ECU used for the system of FIG. 17.

A system configuration according to the third embodiment of the invention is shown in FIG. 17, and the configuration of the ECU 41 in FIG. 18.

The embodiment shown in FIG. 17 is different from the system configuration of FIG. 1 in that an electronically controlled throttle valve is used. Therefore, only the configuration related to the electronically controlled throttle valve, but not the remaining parts of the configuration, will be explained below.

The electronically controlled throttle valve includes a throttle valve 18, a drive unit 49 and a throttle sensor 31. The angle of the accelerator pedal 47 depressed is detected by the acceleration sensor 48, and input to the ECU 41, as shown in FIG. 18. The ECU 41 outputs a signal corresponding to the accelerator pedal angle to the electronically controlled throttle valve. The throttle drive unit 49 controls the opening of the throttle 18 in accordance with the signal.

Figure 19:
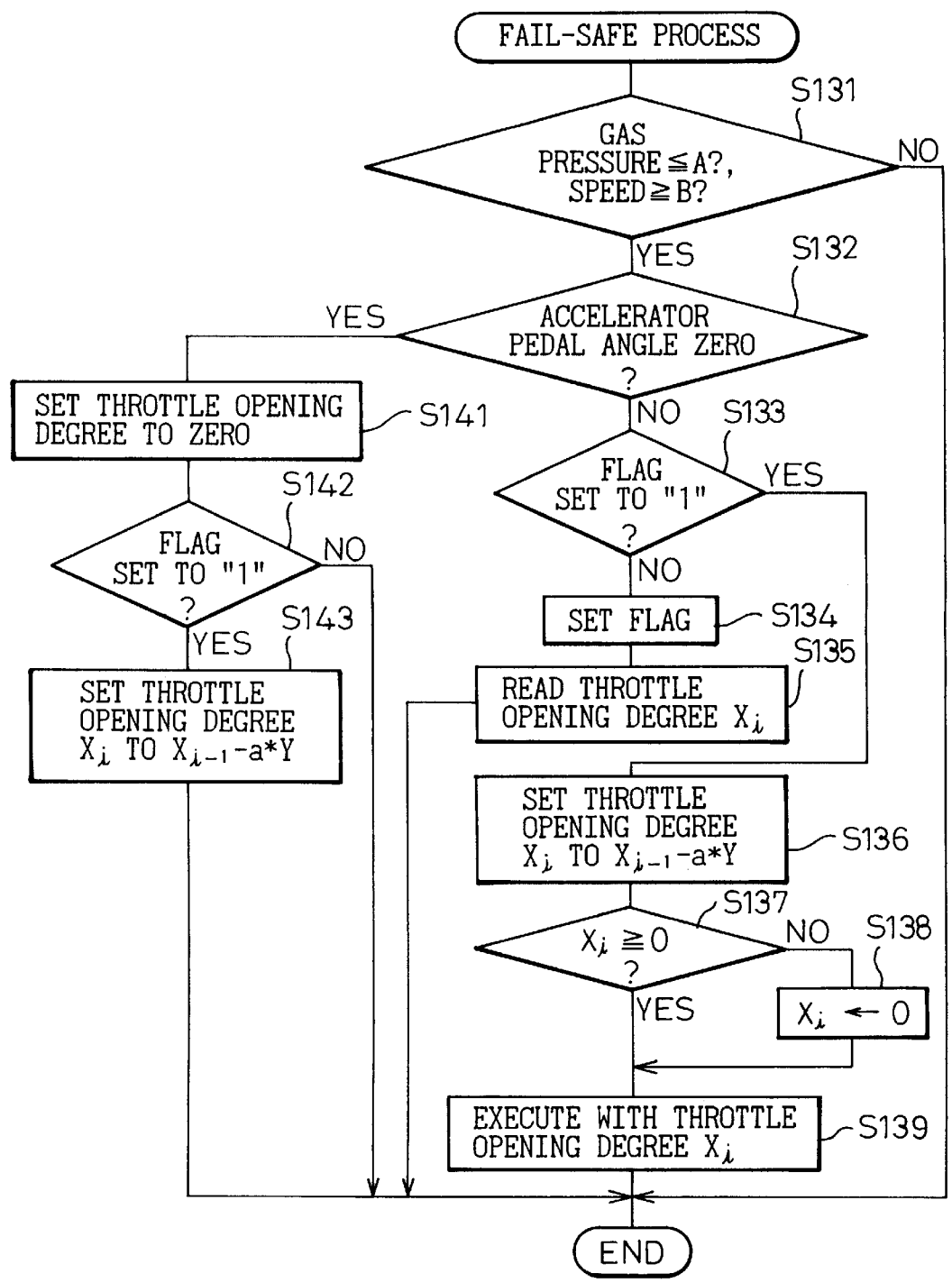
FIG. 19 is a flowchart showing the contents of the fail-safe processing of the ECU of FIG. 17.

FIG. 19 is a flowchart showing the fail-safe processing according to the third embodiment. The fuel injection control unit starts the fail-safe processing at predetermined time intervals.

In step S131, it is determined whether a gas pressure drop of not more than a predetermined value A and the vehicle speed of not lower than a predetermined value B have been detected or not. The predetermined value A of the gas pressure is defined as a gas pressure at which a misfire occurs. The detection of the gas pressure and the vehicle speed is effected in a manner similar to step S1 of FIG. 3 of the first embodiment.

Upon detection of the gas pressure drop and the excessive vehicle speed, the catalyst unit 25 may be destroyed. Thus, the process proceeds to step S132 and subsequent steps for reducing the vehicle speed. Unless the gas pressure drops or the vehicle is moving, the catalyst unit 25 will not be destroyed, and therefore the process is terminated.

In step S132, it is determined whether the accelerator pedal 47 is not depressed at all or not. If the accelerator pedal 47 is depressed, it is determined whether the flag is "1" (set) or not in step S133. When the gas pressure drop and an excessive vehicle speed are detected first, the flag is "0", and therefore the process proceeds to step S134. In step S134, the flag is set to "1", followed by step S136 for reading the opening degree $X_i$ of the throttle valve 18, thereby terminating the process.

Upon reexecution of the process of FIG. 19 after the lapse of a predetermined time, the process proceeds to step S136 because the flag is set to "1" in step S133. In step S136, the opening degree $X_i$ of the throttle valve 18 is calculated from the following equation.

$$X_i = X_{i-1} - a*Y$$

where $X_{i-1}$ is the throttle opening degree read previously, Y the vehicle speed and a a coefficient.

In step S137, it is determined whether the calculated throttle opening degree $X_i$ is not higher than 0, and if it is not higher than 0, the throttle opening is set to 0 in step S138.

In step S139, the process is executed for setting the throttle valve 18 to the calculated throttle opening degree $X_i$. A means for reducing the vehicle speed is to reduce the amount of the fuel which otherwise might be required for the particular vehicle speed. Another alternative is to reduce the fuel supply amount while at the same time reducing the amount of air mixed with the fuel.

Upon detection of the gas pressure drop and the excessive vehicle speed by the process described above, the opening degree $X_i$ of the electronically controlled throttle valve 10 gradually decreases and the vehicle speed decreases. As a result, the catalyst temperature in the catalyst unit 25 also drops. Even when uncombusted gas is supplied into the catalyst unit 25 due to the decrease in gas pressure, therefore, combustion is not started in the catalyst unit 25.

The driver may leave the accelerator pedal undepressed in an attempt to stop the vehicle while the throttle opening degree $X_i$ is under the control of the fuel injection control unit. In such a case, the undepressed state of the accelerator pedal is detected in step S132, and the process proceeds to step S141 where the throttle opening degree is set to 0. As a result, the vehicle is prevented from moving against the will of the driver.

Then, in step S142, it is determined whether the flag is "1" or not, and if it is "1", the throttle opening degree $X_i = X_{i-1} - a*Y$ is calculated in step S143. If the flag is "0", on the other hand, the process is terminated as it is. By calculating the throttle opening degree $X_i$ in step S143, the fail-safe control operation is assured in accordance with the current vehicle speed even in the case where the driver depresses the accelerator pedal 47 excessively.

Figure 20:
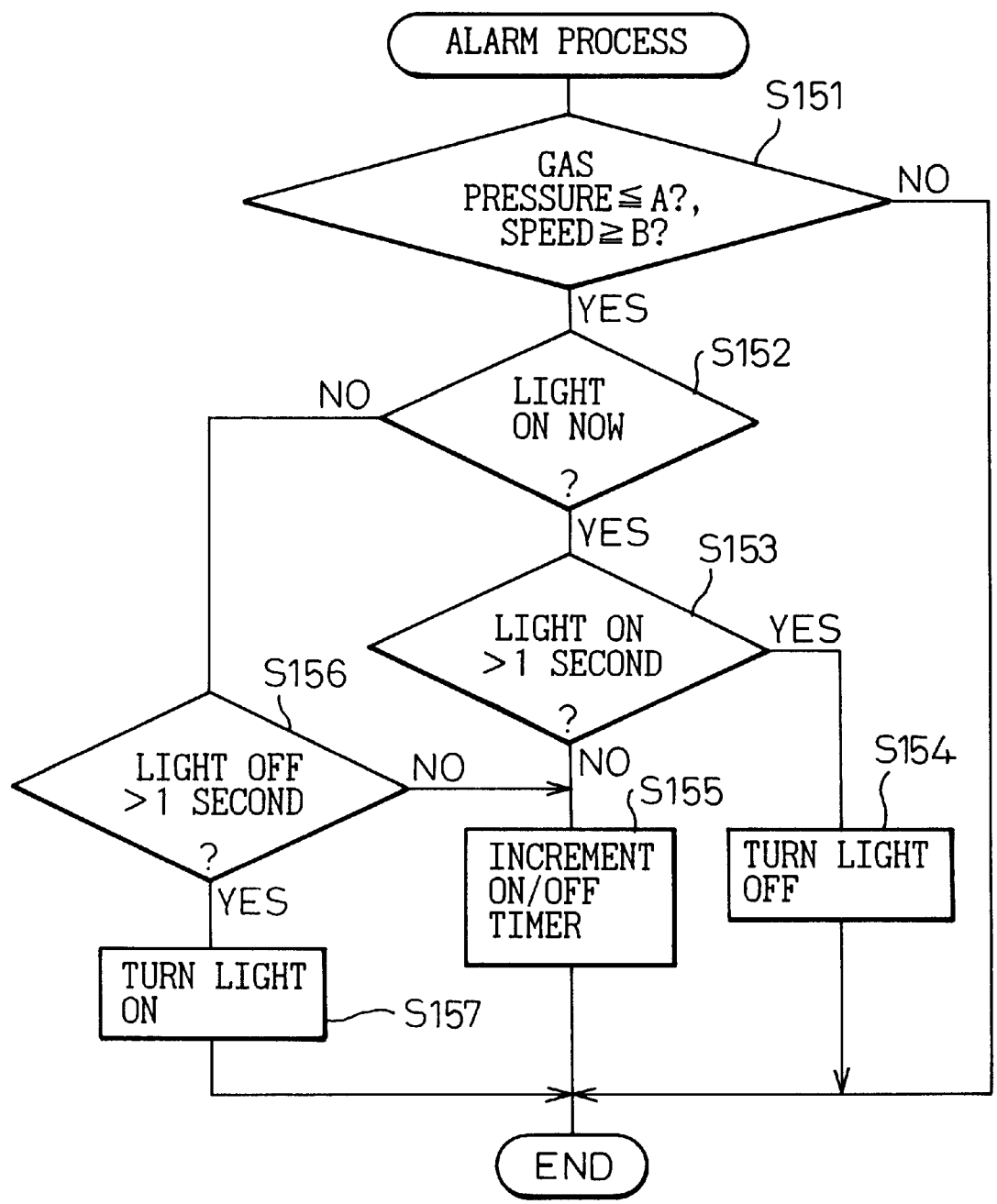
FIG. 20 is a flowchart showing the contents of an alarm process in FIG. 19.

FIG. 20 shows the alarm process according to the third embodiment of the invention. In the prior art, the process for turning on the alarm light 46 when the gas pressure drops is performed by the ECU 41. In the process described below, when the gas pressure decreases to such an extent that the possibility of combustion in the catalyst unit 25 arises, the alarm light 46 is made to flash to warn the driver.

The fuel injection control unit starts the alarm processing at predetermined time intervals. In step S151, it is determined whether a gas pressure drop of not lower than a predetermined value A and a vehicle speed B of not less than a predetermined value have been detected or not. The gas pressure and the vehicle speed are detected in a manner similar to step S6 in FIG. 16 of the second embodiment described above. Upon detection of the gas pressure drop and the excessive vehicle speed, the process proceeds to step S152. Unless the gas pressure drops or the vehicle speed becomes excessive, the process is terminated.

In step S152, it is determined whether the alarm light 46 is turned on or not. If it is not turned on, the process proceeds to step S156, while if it is turned on, it is determined in step S153 whether the turn-on time of the alarm light 46 has exceeded one second or not. This is determined by the count on an on/off timer described later. In the case where the turn-on time exceeds one second, the alarm light 46 is turned off in step S154. Otherwise, the process proceeds to step S155, where the on/off timer is incremented and the process is terminated.

In the case where it is determined in step S152 that the alarm light 46 is not turned on, it is determined in step S156 whether the turn-off time of the alarm light 46 has exceeded one second or not. In the case where the turn-off time exceeds one second, the alarm light 46 is turned on in step S157. Unless it exceeds one second, on the other hand, the on/off timer is incremented in step S155, thus terminating the process.

(Embodiment 4)

In the third embodiment described above, the fuel injection control unit for controlling the fuel injection unit reduces the vehicle speed in the case where the gas pressure sensor detects that the gas pressure is not higher than a predetermined value A and the drive sensor detects that the vehicle speed is not lower than a predetermined value B. According to the fourth embodiment, in contrast, the vehicle speed is reduced in the case where the gas pressure sensor detects a gas pressure of not lower than the predetermined value A and the catalyst temperature detecting means detects a catalyst temperature of not lower than a predetermined value C at the same time.

In the fourth embodiment, the configuration of the fuel injection control system shown in FIG. 17 can be used. Also, the configuration of the ECU shown in FIG. 18 can be used with this system.

Figure 21:
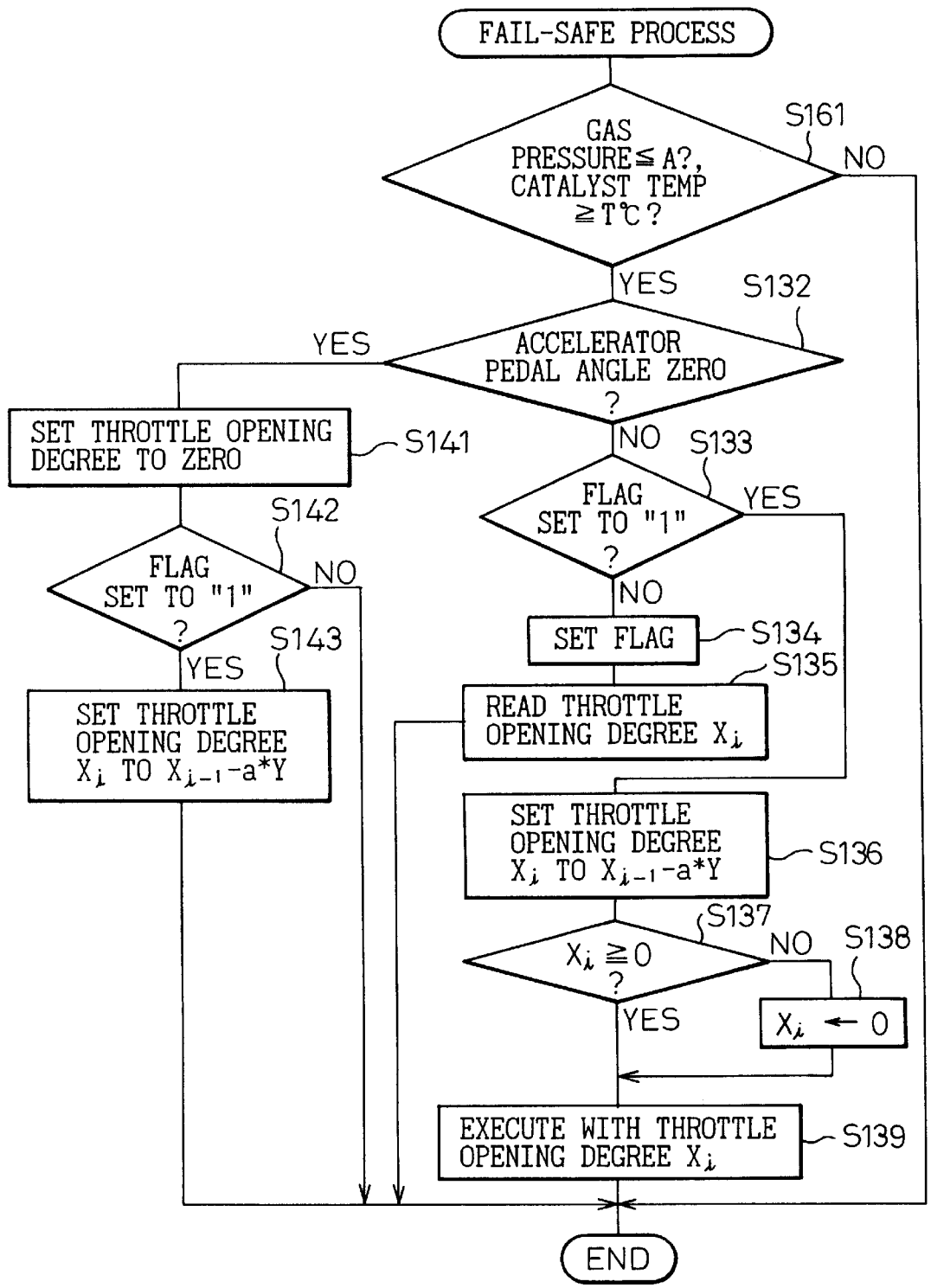
FIG. 21 is a flowchart showing the contents of the fail-safe processing of the ECU according to the third embodiment of the invention.

FIG. 21 is a flowchart showing the fail-safe process according to this embodiment. The flowchart of FIG. 21 is similar to FIG. 19 of the third embodiment, except for step S161. Therefore, only step S161, but not the other steps, will be explained.

In step S161, it is determined whether the gas pressure drop to not lower than a predetermined value A and a catalyst temperature of not lower than the predetermined value C have been detected or not. The gas pressure drop and the excessive vehicle speed are detected in a manner similar to step S6 in FIG. 16 of the second embodiment.

The alarm processing according to the fourth embodiment is similar to that of FIG. 20 described above.

What is claimed is:

1. A fuel injection control system, for a compressed natural gas-fueled automotive vehicle, comprising:

a gas pressure sensor for detecting the gas pressure in a fuel supply path;

moving condition detecting means for detecting that the vehicle is moving; and a fuel injection control unit for controlling said fuel injection system by stopping the fuel supply in the case where said gas pressure sensor detects a gas pressure reduction of not more than a predetermined value and said moving condition detecting means detects that the vehicle is moving.

2. A fuel injection control system for a compressed natural gas-fueled automotive vehicle according to claim 1, wherein said fuel injection control unit calculates the time required before a misfire upon detection of said gas pressure drop and the vehicle moving condition, and stops supplying the fuel after the lapse of said calculated time following the detection of said gas pressure drop and said vehicle moving condition.

3. A fuel injection control system for a compressed natural gas-fueled automotive vehicle according to claim 1, further comprising a sensor for detecting a misfire of said engine, wherein said fuel injection control unit stops supplying the fuel upon detection of said gas pressure drop and said vehicle moving condition and upon detection of a misfire by said misfire sensor at the same time.

4. A fuel injection control system for a compressed natural gas-fueled automotive vehicle according to claim 1, further comprising speed detecting means for detecting the vehicle speed, wherein said fuel injection control unit stops supplying the fuel upon detection of said gas pressure drop and said vehicle moving condition and upon detection by said speed detecting means that the vehicle speed is not lower than a predetermined value.

5. A fuel injection control system for a compressed natural gas-fueled automotive vehicle according to claim 1, further comprising an air-fuel ratio sensor for detecting the air-fuel ratio, wherein said fuel injection control unit stops supplying the fuel upon detection of said gas pressure drop and said vehicle moving condition and upon detection by said air-fuel ratio sensor that the air-fuel ratio is not higher than a predetermined value.

6. A fuel injection control system for a compressed natural gas-fueled automotive vehicle according to claim 1, wherein said fuel injection control unit alternates between the fuel supply stop and the fuel supply at predetermined time intervals.

7. A fuel injection control system for a compressed natural gas-fueled automotive vehicle according to claim 1, further comprising speed detecting means for detecting the vehicle speed, wherein said fuel injection control unit alternates between the fuel supply stop and the fuel supply at time intervals corresponding to the speed detected by said speed detecting means.

8. A fuel injection control system for a compressed natural gas-fueled automotive vehicle according to claim 1, further comprising an air-fuel ratio sensor, wherein said fuel injection control unit normally controls the air-fuel ratio by feedback and stops the feedback control of the air-fuel ratio at the time of fuel supply stop.

9. A fuel injection control system for a compressed natural gas-fueled automotive vehicle according to claim 1, further comprising an air-fuel ratio sensor for detecting the air-fuel ratio, wherein said fuel injection control unit normally controls the air-fuel ratio employing learning and stops said control of the air-fuel ratio employing learning when the fuel supply is stopped.

10. A fuel injection control system for a compressed natural gas-fueled automotive vehicle according to claim 1, further comprising an air-fuel ratio sensor for detecting the air-fuel ratio, wherein said fuel injection control unit normally controls the air-fuel ratio employing learning and initializes the learned value of the air-fuel ratio when the fuel supply is stopped.

11. A fuel injection control system for a compressed natural gas-fueled automotive vehicle according to claim 1, wherein said fuel injection control unit issues an alarm by a remaining fuel amount alarm light when said gas pressure sensor detects a gas pressure drop.

12. A fuel injection control system for a compressed natural gas-fueled automotive vehicle according to claim 1, wherein said fuel injection control unit issues an alarm by a remaining fuel amount alarm light when the fuel supply is stopped.

13. A fuel injection control system for a compressed natural gas-fueled automotive vehicle, comprising:
   a gas pressure sensor for detecting the gas pressure in a fuel supply path;
   catalyst temperature detecting means for detecting the temperature of the catalyst arranged downstream of the internal combustion engine; and
   a fuel injection control unit for controlling said fuel injection system by stopping the fuel supply in the case where said gas pressure sensor detects a gas pressure reduction of not more than a predetermined value and said catalyst temperature detecting means detects that the catalyst temperature is not lower than a predetermined value.

14. A fuel injection control system for a compressed natural gas-fueled automotive vehicle according to claim 13, wherein said fuel injection control unit calculates the time required before the occurrence of a misfire upon detection of said gas pressure drop and the increase in said catalyst temperature, and stops supplying the fuel after the lapse of said calculated time following the detection of said gas pressure drop and said increase in the catalyst temperature.

15. A fuel injection control system for a compressed natural gas-fueled automotive vehicle according to claim 13, further comprising a sensor for detecting a misfire of said engine, wherein said fuel injection control unit stops supplying the fuel upon detection of said gas pressure drop and the increase in said catalyst temperature and upon detection of a misfire by said misfire sensor at the same time.

16. A fuel injection control system for a compressed natural gas-fueled automotive vehicle according to claim 13, further comprising speed detecting means for detecting the vehicle speed, wherein said fuel injection control unit stops supplying the fuel upon detection of said gas pressure drop and the increase in said catalyst temperature and upon detection by said speed detecting means that the vehicle speed is not lower than a predetermined value.

17. A fuel injection control system for a compressed natural gas-fueled automotive vehicle according to claim 13, further comprising an air-fuel ratio sensor for detecting the air-fuel ratio, wherein said fuel injection control unit stops supplying the fuel upon detection of said gas pressure drop and the increase in said catalyst temperature and upon detection by said air-fuel sensor that the air-fuel ratio is not higher than a predetermined value.

18. A fuel injection control system for a compressed natural gas-fueled automotive vehicle, comprising:
   a gas pressure sensor for detecting the gas pressure in a fuel supply path;
   moving condition detecting means for detecting that the vehicle is moving; and
   a fuel injection control unit for controlling said fuel injection control system, including means for reducing the vehicle speed when said gas pressure sensor detects that the gas pressure has dropped by not higher than a predetermined value and when said moving condition detecting means detects that the vehicle is moving at not lower than a predetermined speed.

19. A fuel injection control system for a compressed natural gas-fueled automotive vehicle according to claim 18, wherein said means for reducing the vehicle speed reduces the fuel supply amount required for said vehicle speed while at the same time reducing the amount of the air mixed with the fuel.

20. A fuel injection control system for a compressed natural gas-fueled automotive vehicle according to claim 18, wherein said gas pressure of not higher than a predetermined value is a gas pressure at which a misfire occurs.

21. A fuel injection control system for a compressed natural gas-fueled automotive vehicle, comprising:
   a gas pressure sensor for detecting the gas pressure in a fuel supply path;
   catalyst temperature detecting means for detecting the temperature of the catalyst arranged downstream of the internal combustion engine; and
   a fuel injection control unit for controlling said fuel injection system including means for reducing the vehicle speed when said gas pressure sensor detects that the gas pressure has dropped by not higher than a predetermined value and said catalyst temperature detecting means detects that the catalyst temperature is not lower than a predetermined value.

22. A fuel injection control system for a compressed natural gas-fueled automotive vehicle according to claim 21, wherein said means for reducing the vehicle speed reduces the fuel supply amount required for said vehicle speed while at the same time reducing the amount of the air mixed with the fuel.

23. A fuel injection control system for a compressed natural gas-fueled automotive vehicle, comprising:
- a gas pressure sensor for detecting the gas pressure in a fuel supply path;
- moving condition detecting means for detecting the speed at which the vehicle is moving;
- a fuel injection control unit for controlling said fuel injection control system, including means for reducing the vehicle speed when said gas pressure sensor detects that the gas pressure has dropped by an amount not higher than a predetermined value and said moving condition detecting means detects that the vehicle is moving at not lower than a predetermined speed; and
- alarm means for issuing a first alarm when said gas pressure sensor detects that the gas pressure has dropped, and issuing a second alarm when said vehicle speed is reduced.

* * * * *